United States Patent [19]

Schulze

[11] Patent Number: 5,088,277
[45] Date of Patent: Feb. 18, 1992

[54] AIRCRAFT ENGINE INLET COWL ANTI-ICING SYSTEM

[75] Inventor: Wallace M. Schulze, West Chester, Ohio

[73] Assignee: General Electric Company, Cincinnati, Ohio

[21] Appl. No.: 251,727

[22] Filed: Oct. 3, 1988

[51] Int. Cl.⁵ .............................................. F02C 7/047
[52] U.S. Cl. .............................. 60/39.093; 244/134 R
[58] Field of Search .................. 60/39.043; 244/134 R, 244/134 B

[56] References Cited

U.S. PATENT DOCUMENTS

| | | | |
|---|---|---|---|
| 3,057,154 | 10/1962 | Sherlaw et al. | 60/39.093 |
| 3,566,606 | 3/1971 | Mortlock | 60/226 |
| 3,749,336 | 7/1973 | Christensen et al. | 244/134 B |
| 3,925,979 | 12/1975 | Ziegler | 60/39.07 |
| 3,933,327 | 1/1976 | Cook et al. | 244/134 B |
| 3,981,466 | 9/1976 | Shah | 244/134 R |
| 4,240,250 | 12/1980 | Harris | 60/39.09 |
| 4,546,604 | 10/1985 | Moore et al. | 60/39.093 |
| 4,674,714 | 6/1987 | Cole et al. | 244/134 B |
| 4,688,745 | 8/1987 | Rosenthal | 244/134 B |
| 4,738,416 | 4/1988 | Birbragher | 60/39.093 |

Primary Examiner—Louis J. Casaregola
Attorney, Agent, or Firm—Jerome C. Squillaro

[57] ABSTRACT

A system is provided for preventing and removing ice accumulation from the leading edges of an inlet cowl of an aircraft gas turbine engine. High pressure, high temperature air, preferably from a port on the engine compressor, is provided to an annular duct located within an annular chamber formed at the leading edge of the inlet cowl. A plurality of air ejector nozzles are spaced about the air duct and function to direct anti-icing air at a supersonic velocity toward the forward inboard surface of the inlet cowl and create a swirling air mass within the annular chamber.

22 Claims, 2 Drawing Sheets

AIRCRAFT ENGINE INLET COWL ANTI-ICING SYSTEM

The present invention relates to gas turbine engines for aircraft that utilize an air inlet cowl to direct the airflow into the main engine and more specifically to an apparatus for preventing and removing the accumulation of ice from the inlet cowl of an aircraft gas turbine engine.

BACKGROUND OF THE INVENTION

The formation of ice on the leading edges of aircraft engine inlets can occur during flight through clouds containing supercooled water droplets or during ground operation in inclement weather. Protection against ice formation is necessary since ice build-up near the engine inlet may obstruct the free flow of air into and around the engine adversely affecting engine performance. Additionally, damage may be caused to turbine blades or other internal engine components by chunks of ice breaking loose from the leading edge of the air inlet and entering the inlet airstream.

A typical inlet cowl anti-icing system has warm air introduced into a chamber within the leading edge of the inlet cowl. The anti-icing system keeps the inboard surface of the inlet cowl above freezing temperature and prevents ice formation that could interfere with engine performance. Spent air from the inlet cowl anti-icing system is often exhausted overboard without full utilization of the thermal energy contained therein, thereby wasting energy extracted from the engine's propulsion cycle.

The General Electric Company's unducted fan engine (UDF) operates with rotating blading both inboard and outboard of the inlet cowl and therefor requires anti-icing of the outboard surface of the inlet cowl in addition to the inboard surface as ice accumulation along the outboard surface may interfere with the airflow through the external blading or break loose and impact with the blading. Venting of spent anti-icing air overboard may also adversely affect the downstream structures or performance of the UDF engine.

OBJECTS OF THE INVENTION

It is a primary object of the present invention to provide a new and improved gas turbine engine inlet cowl anti-icing system for an aircraft which is not subject to the foregoing disadvantages.

It is an additional object of the present invention to provide a new and improved anti-icing system which prevents and removes ice accumulation from both the inboard and outboard surfaces of an aircraft engine nose cowl.

It is a further object of the present invention to provide a new and improved anti-icing system for an aircraft gas turbine engine having an improved means of exhausting the spent air of the anti-icing system.

It is also an object of the present invention to provide a new and improved anti-icing system for an aircraft gas turbine engine which more efficiently utilizes thermal energy drawn from the engine's propulsion cycle to prevent and remove ice accumulation from the leading edges of an inlet cowl.

SUMMARY OF THE INVENTION

In accordance with the principles of the present invention, there is provided a system for preventing and removing ice accumulation from the inboard and outboard surfaces of the inlet cowl of an aircraft gas turbine engine. An annular chamber is formed within the inlet cowl with the forward inboard and forward outboard walls of the cowl forming walls of the chamber. Located within this chamber is an annular air duct which, during engine operation, is provided with high pressure, high temperature air preferably from a port on the engine compressor. A plurality of air ejector nozzles are spaced about the air duct and function to direct anti-icing air at a supersonic velocity toward the forward inboard surface of the inlet cowl.

In a further embodiment of the invention, the nozzles are angled to create a swirling mass of anti-icing air which scrubs all surfaces of the chamber. An improved means of exhausting the spent anti-icing air from the chamber through a plurality of small vents located in the inboard surface of the cowl into the inner barrel of the engine inlet is also provided.

The above and other objects of the present invention together with the features and advantages thereof will become apparent from the following detailed specification when read in conjunction with the accompanying drawings in which applicable reference numerals have been carried forward.

DETAILED DESCRIPTION OF THE INVENTION

Figure 1:
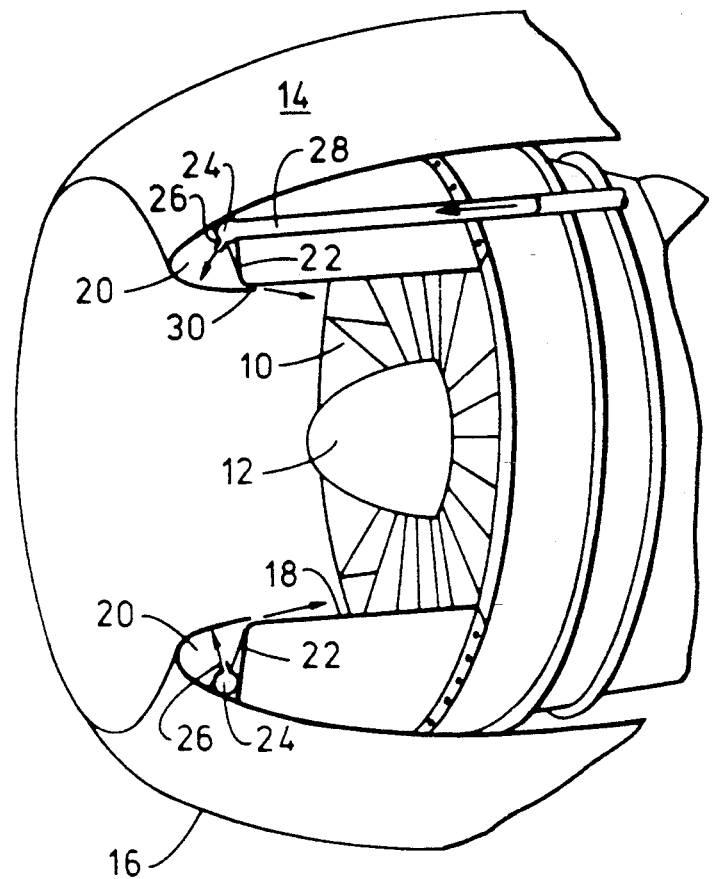
FIG. 1 is a perspective view of the forward portion of an aircraft gas turbine engine partially cut away to show the system of the present invention.

Referring now to the drawings, FIG. 1 is a perspective view of the inlet section of a gas turbine engine partially cut away to show the system of the present invention. The forward portion of the engine includes an intake guide vane assembly 10 and a nose cone 12 enclosed within a generally tubular, axially extending inlet cowl 14 having an outboard wall 16 and an inboard wall 18. Inboard wall 18 forms an inlet duct which directs engine inlet air through guide vane assembly 10 into the engine compressor (not shown).

In flight or during ground operation under icing conditions, ice tends to form on the leading surfaces of walls 16 and 18. The ice changes the geometry of the inlet area between cowl 14 and nose cone 12, adversely affecting the required quantity and flow path of incoming air. In addition, pieces of ice may break away and cause damage to internal or external downstream engine components.

To prevent the formation of ice along the leading surfaces of intake cowl 14, an annular chamber 20 is formed between the leading surfaces of walls 16 and 18. A structural ring or bulkhead 22 joining walls 16 and 18 forms the aft wall of chamber 20. Within chamber 20 there is included an annular air duct 24 having a plurality of air ejector nozzles 26.

In operation, air duct 24 is provided with high temperature, high pressure air from a port on the engine compressor (not shown) through conduit means 28. Alternatively, hot exhaust gases bled from the engine exhaust could be provided to air duct 24. The heated anti-icing air is thereafter injected into chamber 20 through air ejector nozzles 26 to heat the leading surfaces of walls 16 and 18. A plurality of vents 30 are located in inboard wall 18 at the aft of chamber 20 to exhaust the spent anti-icing air from chamber 20 into the engine intake airstream.

Figure 2:
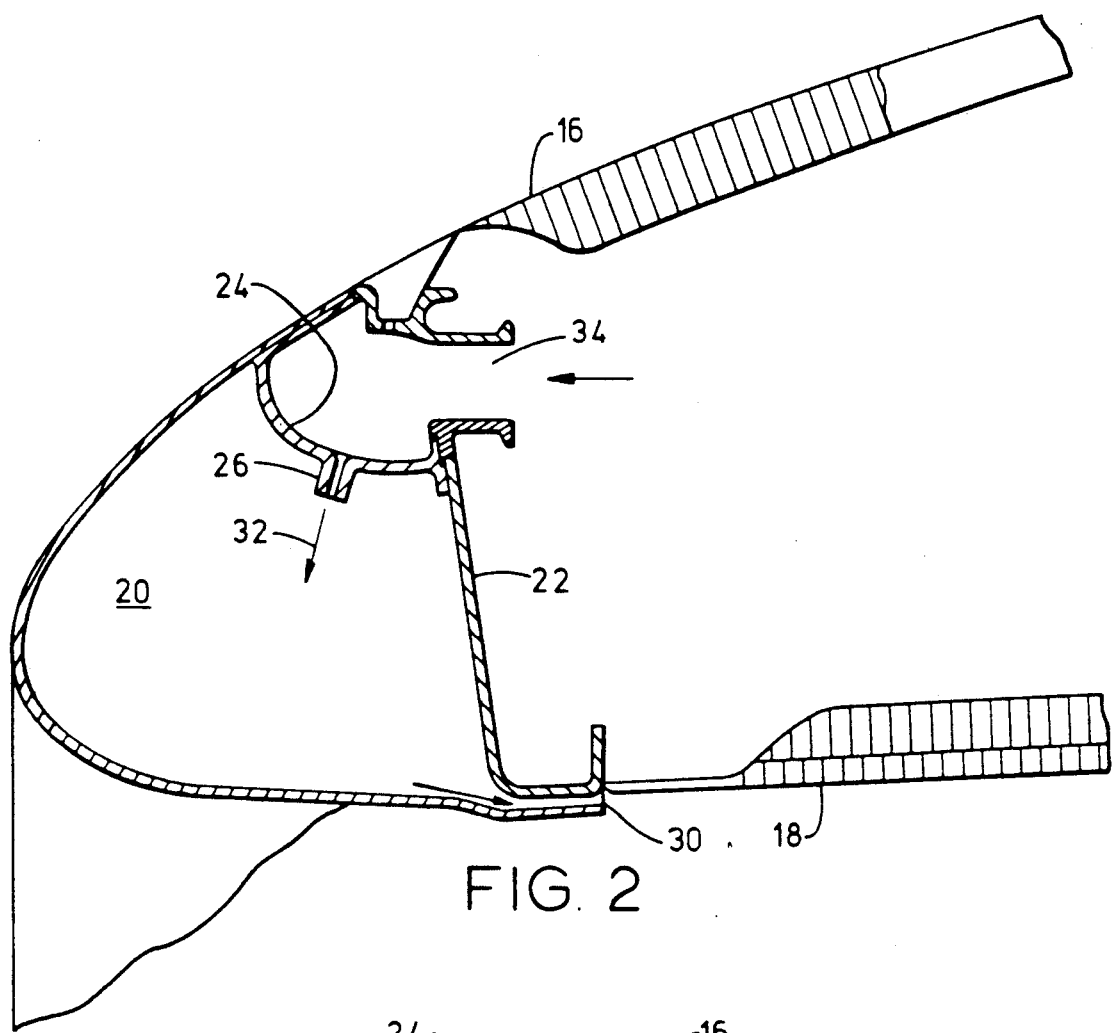
FIG. 2 is an axial cross-sectional view through the inlet cowl of the gas turbine engine of FIG. 1.

FIG. 2 is an axial cross-sectional view through the inlet cowl of the gas turbine engine of FIG. 1 showing in cross-section chamber 20 and air duct 24. Anti-icing air enters air duct 24 which is located at the aft outermost region within chamber 20 through a port 34 located in bulkhead 22 and is injected at a supersonic velocity through air ejector nozzles 26 into chamber 20. Air ejector nozzles 26 are designed to provide preferential heating to the inboard cowl wall by directing air flow toward the forward inner surface of wall 18 as shown by arrow 32. Heat is transmitted directly to the leading edge of inboard wall 18 by impingement of anti-icing air. Spent anti-icing air exits chamber 20 through air vents 30 located around the inboard surface of the cowl. The vents direct the exhaust air along the surface of inboard wall 18 avoiding any significant disturbance of the engine's inlet airstream and preventing the freezing of run-back water from the leading edges of the inlet cowl. The exhausted air will pass into the engine and become a part of the core engine's airflow.

Figure 3:
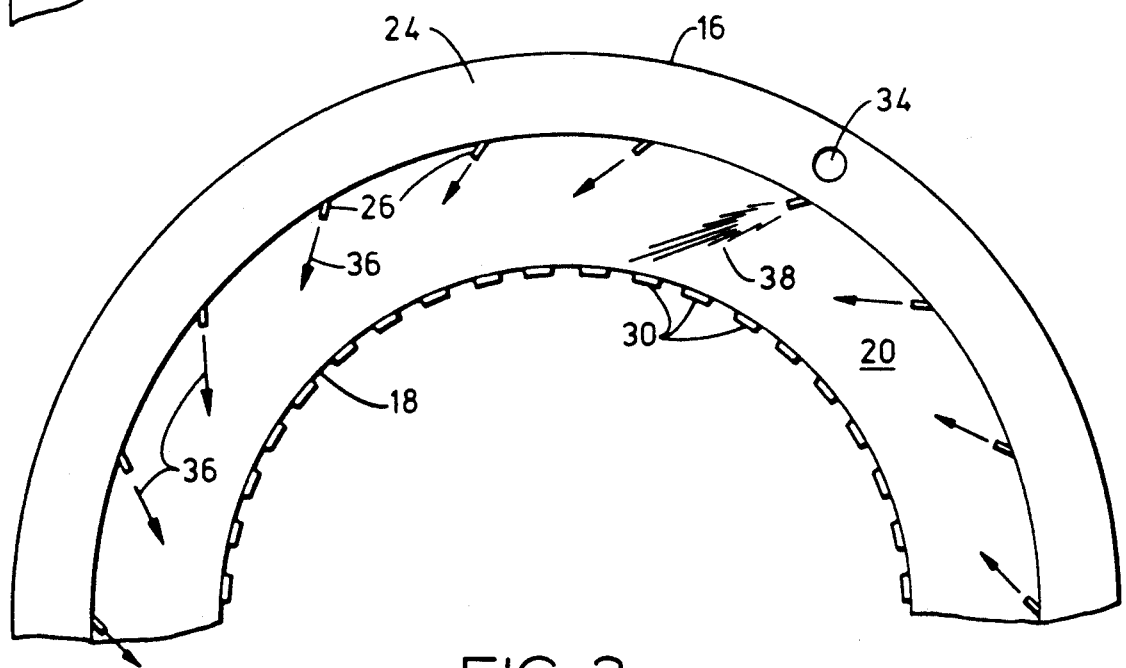
FIG. 3 is a front sectional view into the inlet cowl of the gas turbine engine of FIG. 1.

FIG. 3 is a front sectional view into the inlet cowl of the gas turbine engine of FIG. 1. Shown is the top portion of annular chamber 20 and annular air duct 24. As can be seen, air ejector nozzles 26 direct air streams toward inboard wall 18 but also at an angle with a radial line drawn to the engine axis to establish a high-velocity swirl action around annular chamber 20 with multiple passes of the anti-icing air and vigorous air-scrubbing action. The directions of these ejector nozzle airstreams are shown by arrows 36. An example of an air stream is shown by 38. Nozzles 26 are located to produce minimal interference with the swirling air mass.

Thus, two methods of transmitting heat from the anti-icing air to the surfaces of the inlet cowl, air impingement and air scrubbing, are provided. The air injection system gives preferential heating to the cowl's inboard wall, gives the desired heating to the cowl's outboard wall, and creates a swirl action around chamber 20 with multiple passes of the anti-icing air for heat-transfer to the chamber surfaces before the air is exhausted.

Exhaust vents 30 are placed in groups around the cowl inboard wall such that the warm air flowing aft will not encounter or disrupt downstream equipment such as inlet temperature sensors. Total exhaust vent area is limited to maintain an appropriate pressure within chamber 20.

Figure 4:
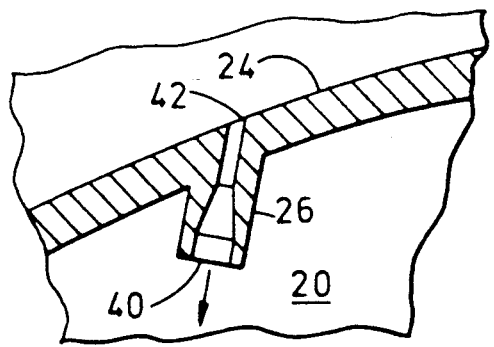
FIG. 4 is a cross-sectional detail view of one of the air ejector nozzles shown in FIG. 3.

FIG. 4 is a cross-sectional detail view of one of the air ejector nozzles shown in FIG. 3. The passageway through the nozzle is seen to be divergent, having a larger cross-sectional area at the nozzle's exhaust 40 than at the nozzle's intake 42. The divergent nozzle, allowing a controlled expansion of the anti-icing air as it passes from duct 24 into chamber 20, causes the velocity of the airstream to become supersonic. Expanding the airstream to supersonic velocity increases the contact between the high temperature anti-icing air and the cowl surfaces thereby increasing heat transfer to the cowl surfaces. Heat transfer through air-scrubbing is also increased as the velocity of the swirling air mass and the vigorousness of the scrubbing action are made greater through increases in the airstream velocity.

Figure 5:
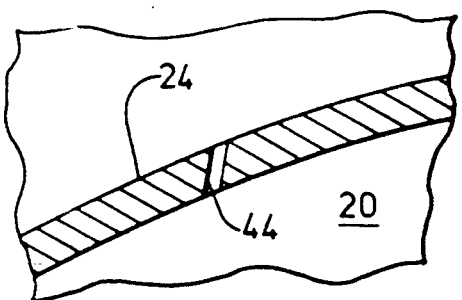
FIG. 5 is a cross-sectional detail view of an alternate design to the air ejector nozzle shown in FIG. 4.

FIG. 5 is a cross-sectional detail view of an alternate design to the air ejector nozzle shown in FIG. 4. The nozzle is seen to be a hole of uniform diameter 44 formed through the wall of air duct 24. Hole 44 is formed to direct an air stream of non-supersonic velocity toward the cowl's inboard wall and also to create a swirling air mass within annular chamber 20.

The preceding discussion and accompanying drawings disclose a new and improved inlet cowl anti-icing system for an aircraft engine. The new and improved anti-icing system provides efficient heating of both inboard and outboard surfaces of the inlet cowl, with preferential heating provided to the leading edges of the cowl's inboard surface, an area where ice accumulation is most hazardous. Heat is transferred from the anti-icing air to the inlet cowl leading surfaces through air impingement and by air scrubbing action. In addition, spent anti-icing air is exhausted along the inboard cowl wall into the engine's intake airstream thereby preventing refreezing of run-back water from the inlet cowl. Swirling the anti-icing air around the annular chamber for many revolutions prior to exhausting the air and exhausting the air into the intake duct along the inboard wall of the inlet cowl provide increased opportunities for heat transfer from the anti-icing air thereby making more efficient use of thermal energy extracted from the engine propulsion cycle.

From the foregoing specification it will be clear to those skilled in the art that the invention is not limited to the specific embodiment described and that numerous modifications are possible without departing from the scope of the present invention. For example, the number, location or design of air ejectors and exhaust vents can be varied to produce different temperatures, pressure or velocities within chamber 20 in accordance with the icing conditions anticipated to be encountered by the specific aircraft. The geometric shape of chamber 20, air duct 24 or other system components and the positioning of the components may also be varied.

These and other variations, changes, substitutions and equivalents will be readily apparent to those skilled in the art without departing from the spirit and scope of the present invention. Accordingly, it is intended that the present invention be limited only by the scope of the appended claims.

What is claimed is:

1. Apparatus for preventing and removing ice accumulation from the leading edge of a gas turbine engine inlet cowl, said engine having an center engine axis thereof and said cowl having an inboard wall and a outboard wall, said inboard wall defining an inlet duct for directing inlet air into said engine, the apparatus comprising:
   an annular chamber at the leading edge of said cowl, the forward inboard and forward outboard walls of said cowl forming walls of said chamber;
   a plurality of ejector nozzles spaced about said chamber, each of said nozzles oriented so as to direct a gas stream toward the forward inboard wall of said cowl and said nozzles are also angled toward a tangential direction so as to produce a swirling gas flow; and
   means for providing high pressure gases of an elevated temperature relative to the temperature of said inlet air, to each of said ejector nozzles.

2. Apparatus according to claim 1, wherein said ejector nozzles are equally spaced about said duct.

3. Apparatus according to claim 1, wherein the source of said high pressure gases of elevated temperature is a port on the engine compressor.

4. Apparatus according to claim 1, wherein the source of said high pressure gases of elevated temperature is a port in the engine exhaust system.

5. Apparatus according to claim 1, further comprising means for exhausting gases to the outside of said chamber.

6. Apparatus according to claim 5, wherein said means for exhausting gases comprises a plurality of vents located around the inboard wall of said cowl for exhausting gases from the aft region of said chamber into said inlet duct.

7. Apparatus according to claim 6, wherein the total vent area of said plurality of vents is limited to maintain a predetermined pressure within said chamber.

8. Apparatus according to claim 6, wherein said plurality of vents are oriented so as to direct the exhausting gases along the inboard wall defining said inlet duct.

9. Apparatus according to claim 8, wherein said vents are equally spaced about said inboard wall.

10. Apparatus for preventing and removing ice accumulation from the leading edge of a gas turbine engine inlet cowl, said cowl having an inboard wall and a outboard wall, said inboard wall defining an inlet duct for directing inlet air into said engine, the apparatus comprising:
    an annular chamber at the leading edge of said cowl, the forward inboard and forward outboard walls of said cowl forming walls of said chamber;
    a plurality of ejector nozzles spaced about said chamber, each of said nozzles oriented so as to direct a gas stream toward the forward inboard wall of said cowl, said ejector nozzles being further oriented to create a swirling hot gas mass within said annular chamber; and
    means for providing high pressure gases of an elevated temperature relative to the temperature of said inlet air, to each of said ejector nozzles.

11. Apparatus according to claim 10, wherein said ejector nozzles are equally spaced about said duct.

12. Apparatus according to claim 10, wherein the source of said high pressure gases of elevated temperature is a port on the engine compressor.

13. Apparatus according to claim 10, wherein the source of said high pressure gases of elevated temperature is a port in the engine exhaust system.

14. Apparatus according to claim 10, further comprising means for exhausting gases to the outside of said chamber.

15. Apparatus according to claim 14, wherein said means for exhausting gases comprises a plurality of vents located around the inboard wall of said cowl for exhausting gases from the aft region of said chamber into said inlet duct.

16. Apparatus according to claim 15, wherein the total vent area of said plurality of vents is limited to maintain a predetermined pressure within said chamber.

17. Apparatus according to claim 15, wherein said plurality of vents are oriented so as to direct the exhausting gases along the inboard wall defining said inlet duct.

18. Apparatus according to claim 17, wherein said vents are equally spaced about said inboard wall.

19. Apparatus for preventing and removing ice accumulation from the leading edge of a gas turbine engine inlet cowl, said cowl having an inboard wall and a outboard wall, said inboard wall defining an inlet duct for directing inlet air into said engine, the apparatus comprising:
    an annular chamber at the leading edge of said cowl, the forward inboard and forward outboard walls of said cowl forming walls of said chamber;
    an annular duct within said chamber;
    means for providing high pressure gases of an elevated temperature to said duct; and
    a plurality of ejector nozzles spaced about said duct, each of said nozzles oriented so as to direct a gas stream toward the forward inboard wall of said cowl and said nozzles are also oriented so as to produce a swirling gas mass within said annular chamber.

20. Apparatus according to claim 19, wherein said cowl includes an outer structural ring and said duct is formed integral with said structural ring.

21. Apparatus for preventing and removing ice accumulation from the leading edge of a gas turbine engine inlet cowl, said cowl having an inboard wall and a outboard wall, said inboard wall defining an inlet duct for directing inlet air into said engine, the apparatus comprising:
    an annular chamber at the leading edge of said cowl, the forward inboard and forward outboard walls of said cowl forming walls of said chamber;
    an annular duct within said chamber;
    means for providing high pressure gases of an elevated temperature from a port on the engine compressor to said duct;
    a plurality of ejector nozzles equally spaced about said duct, each of said nozzles oriented so as to direct a gas stream toward the forward inboard wall of said cowl and oriented so as to create a swirling hot gas mass within said annular chamber providing heating of both inboard and outboard cowl walls; and
    a plurality of vents located around the inboard wall of said cowl for exhausting gases from the aft region of said chamber into said inlet duct, said vents directing exhaust gases along the inboard wall defining said inlet duct.

22. Apparatus for an aircraft gas turbine engine that is encased in a housing, the apparatus comprising:
    a generally tubular cowl for forming a forward end of said engine housing and having an annular leading edge, said cowl having an inboard wall and an outboard wall with said inboard wall defining an inlet duct for directing inlet air into said engine;
    a bulkhead connecting said inboard wall and said outboard wall and forming a chamber at the leading edge of said cowl;
    an annular duct within said chamber;
    means for providing high pressure gases of an elevated temperature relative to the temperature of said inlet air, to said duct; and
    a plurality of ejector nozzles equally spaced about said duct, each of said nozzles oriented so as to direct a gas stream toward the forward inboard wall of said cowl and oriented so as to create a swirling hot gas mass within said annular chamber providing heating of both inboard and outboard cowl walls.

* * * * *